United States Patent [19]

Sommargren

[11] Patent Number: 4,752,133
[45] Date of Patent: * Jun. 21, 1988

[54] DIFFERENTIAL PLANE MIRROR INTERFEROMETER

[75] Inventor: Gary E. Sommargren, Madison, Conn.

[73] Assignee: Zygo Corporation, Middlefield, Conn.

[ * ] Notice: The portion of the term of this patent subsequent to Sep. 15, 2004 has been disclaimed.

[21] Appl. No.: 810,999

[22] Filed: Dec. 19, 1985

[51] Int. Cl.$^4$ ............................................. G01B 9/02
[52] U.S. Cl. ................................... 356/349; 356/351
[58] Field of Search ...................... 356/349, 351, 358

[56] References Cited

U.S. PATENT DOCUMENTS 3,656,853  4/1972  Bagley et al. ...................... 356/349

OTHER PUBLICATIONS

"A Double-Passed Michelson Interferometer", Bennett, Optics Communications, Vol. 4, No. 6, 2-1972, 428-430.

Primary Examiner—Davis L. Willis
Assistant Examiner—S. A. Turner
Attorney, Agent, or Firm—Stiefel, Gross, Kurland & Pavane

[57] ABSTRACT

A differential plane mirror interferometer comprises a source (10) which emits a light beam containing two orthogonally polarized components of different frequencies; a source of a stabilized electrical reference signal (11) of a frequency corresponding to a difference frequency between the two components of the light beam; a tilted parallel plate (16) having regions of reflection, antireflection and polarization coatings for converting the input beam into two separated, parallel, orthogonally polarized beams; a half-wave retardation plate (29A, 29) located in one of the separated beams for converting the two separated, parallel, orthogonally polarized beams into two separated parallel beams with the same polarization; means including a polarizing beamsplitter (44), for causing each of the separated parallel beams with the same polarization to be reflected twice by one of two plane mirrors (71,70) to produce two parallel output beams with the same polarization; a half-wave retardation plate (29B, 29) located in one of the separated parallel output beams, with the tilted parallel plate (16) for converting the two separated parallel orthogonally polarized output beams having regions of reflection, antireflection and polarization coatings for converting the two separated, parallel, orthogonally polarized output beams into a single output beam in which the phase difference between the two frequency components of the single output beam is directly proportional to the optical path length between the two plane mirrors (70,71); a polarizer (81) for mixing the orthogonal components of the output beam; a photoelectric detector (83) to produce the measurement signal; and a phase/meter accumulator (90) to indicate the phase difference between the reference and measurement signals which is directly proportional to the changes in the optical path length between the two plane mirrors.

37 Claims, 2 Drawing Sheets

DIFFERENTIAL PLANE MIRROR INTERFEROMETER

BACKGROUND OF THE INVENTION

1. Field of the Invention

The present invention relates to apparatus for the measurement of optical path length changes between two plane mirror surfaces. More particularly, the invention relates to optical apparatus which is useful for high accuracy displacement metrology using interferometry.

2. The Prior Art

An interferometer is a basic instrument for most high accuracy displacement measurements in dilatometry, material stability studies, the machine tool industry, and in the semiconductor fabrication industry. One type of interferometer representative of the current state-of-the-art is the differential plane mirror interferometer which measures the optical path length changes between two external mirrors and which is described in R. R. Baldwin and G. J. Siddall, "A double pass attachment for the linear and plane interferometer," Proc. SPIE, Vol. 480, pp. 78–83 (May 1984). A conventional differential plane mirror interferometer consists of a fixed plane mirror and a movable plane mirror, which form the interferometer cavity, and auxiliary optical components (retroreflectors, wave plates, mirrors, beamsplitters) This type of interferometer has an inherent optical resolution of one quarter of the wavelength of the light used and has particularly high stability which is necessary for the ever increasing demand for improved accuracy. Thusly it is particularly insensitive to any tilt of the plane mirrors and motion of the auxiliary optic components.

The conventional differential plane mirror interferometer is, however, overly complicated, requiring many auxiliary optical components thereby subjecting the measurement beams to many reflections. These drawbacks ultimately limit the accuracy that can be achieved due to a lower signal-to-noise in the measurement signal as a result of reduced optical beam power and polarization leakage.

The present invention retains the basic plane mirror interferometer cavity of the conventional differential plane mirror; however, the use of a shear plate in the present invention not only reduces the number of optical elements but also reduces the number of reflections by nearly 50%. The improvements of the present invention thusly further increase the accuracy that can be attained with this type of interferometer.

SUMMARY OF THE INVENTION

In accordance with the instant invention, I provide a differential plane mirror interferometer system capable of measuring accurately either changes in length or changes in optical length comprising: (1) a source of an input beam with two stabilized optical frequencies, with the two different frequencies orthogonally polarized, and with a frequency difference between the two frequencies equal to $f_o$, (2) means in said source, either a frequency stabilized electronic oscillator or a photoelectric mixer with electronic amplifier, for providing an electrical reference signal which corresponds to the frequency difference, $f_o$, between said two stabilized optical frequencies; (3) means, most preferably a tilted parallel plate or shear plate with regions of reflection antireflection and polarizing coatings, for converting said input beam into two separated, parallel, orthogonally polarized beams; (4) means, most preferably a half-wave retardation plate, located in one of said separated beams, for converting said two separated, parallel, orthogonally polarized beams into two separated, parallel, beams with the same polarization; (5) means, most preferably a polarizing beamsplitter, quarter-wave retardation plate, and retroreflector, for causing each of said separated, parallel beams with the same polarization to be reflected twice by one of two plane mirrors, respectively, to produce two parallel output beams with the same polarization; (6) most preferably a half-wave retardation plate, located in one of said separated, parallel output beams for converting said two separated, parallel output beams of the same polarization into two separated, parallel output beams with orthogonal polarization; (7) means, most preferably the aforementioned tilted plate with regions of reflection antireflection and polarizing coatings, for converting said two separated, parallel, orthogonally polarized output beams into a single output beam in which the phase difference between the two frequency components of said single output beam is directly proportional to the optical path length between said two plane mirrors; (8) means, most preferably a polarizer, for mixing said orthogonal components of said single output beam; (9) means, most preferably a photoelectric detector, to produce an electrical measurement signal; and (10) means, most preferably a phase meter/accumulator, to indicate the difference in phase between said electrical reference signal and said electrical measurement signal, said difference in phase being proportional to the optical path length changes between said two plane mirrors.

THE DRAWINGS

DETAILED DESCRIPTION OF THE INVENTION

Figure 1:
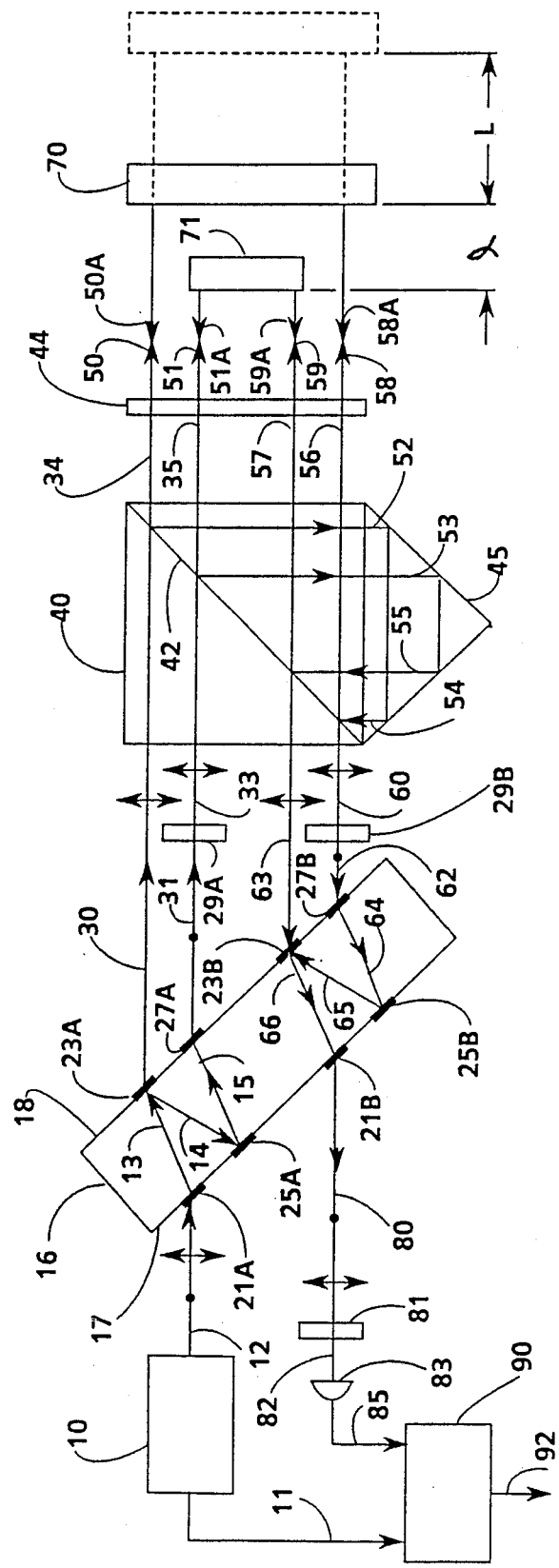
FIG. 1 depicts in schematic form one embodiment of the instant invention where all optical beams are in a single plane.

FIG. 1 depicts in schematic form one embodiment of the instant invention where all optical beams are in a single plane. While the apparatus has application for a wide range of radiation sources, the following description is taken by way of example with respect to an optical measuring system. Light source (10), which most preferably uses a laser, emits input beam (12) which is comprised of two stabilized frequency components which are orthogonally polarized as indicated by the dot and arrow, see, for example, Bagley et al. U.S. Pat. No. 3,458,259 issued July 26, 1969, and commonly owned, copending U.S. patent application Ser. Nos. 710,859, entitled "Apparatus to Transform a single Frequency, Linearly Polarized Laser Beam Into a Beam with Two Orthogonally Polarized Frequencies" filed Mar. 12, 1985; U.S. Ser. No. 710,947, entitled "Heterodyne Interferometer System", filed Mar. 12, 1985; and U.S. Ser. No. 710,927, entitled "Apparatus to Transform a Single Frequency, Linearly Polarized Laser Beam with Two Orthogonally Polarized Frequencies", filed Mar. 12, 1985 all of which are specifically incorporated by refernce herein in their entirety. Source (10) provides an electrical reference signal (11) which corresponds to the frequency difference between the two stabilized frequencies.

Beam (12) is incident on shear plate (16) which is a tilted parallel plate glass substrate with optically flat surfaces (17) and (18) which are mutually parallel. The function of tilted parallel plate (16) is to spatially separate the two frequency components using conventional polarization techniques. Beam (12) passes through surface (1) to become beam (13) which has the same polarization as beam (12). Surface (17) has an antireflection coating (21A) over the region where beam (12) passes through it. Polarizing coating (23A) on surface (18) splits beam (13) so that one polarized frequency component is transmitted as beam (30) whereas the other orthogonally polarized frequency component is reflected as beam (14). Beam (14) is totally reflected from reflective coating (25A) on surface (17) to become beam (15). Beam (15) passes through surface (18) to become beam (31) which has the same polarization as beam (15). Surface (18) has an antireflection coating (27A) over the region where beam (15) passes through it.

Beam (31) passes through half-wave retardation plate (29A) which rotates the linear polarization of beam (31) by 90° so that resultant beam (33) has the same polarization (but still a different frequency) as beam (30). Beams (30) and (33) enter polarizing beamsplitter (40) with polarizing coating (42) and are transmitted as beams (34) and (35) respectively. Beams (34) and (35) pass through quarter-wave retardation plate (44) and are converted into circularly polarized beams (50) and (51), respectively. Beam (51) is reflected from fixed reference mirror (71) to become beam (51A) while beam (50) is reflected from movable mirror (70) affixed to the stage whose relative position is being measured to become beam (50A). Beams (50A) and (51A) pass back through quarter-wave retardation plate (44) and are converted back into linearly polarized beams which are orthogonally polarized to the original incident beams (34) and (35). Beams (50A) and (51A) are reflected by polarizing coating (42) to become beams (52) and (53). Beams (52) and (53) are reflected by retroreflector (45) to become beams (54) and (55). Beams (54) and (55) are reflected by polarizing coating (42) to become beams (56) and (57). Beams (56) and (57) pass through quarter-wave retardation plate (44) and are converted into circularly polarized beams (58) and (59).

Beam (59) is reflected from fixed reference mirror (71) to become beam (59A) while beam (58) is reflected from movable mirror (70) to become beam (58A). Beams (58A) and (59A) pass back through quarter-wave retardation plate (44) and are converted back into linearly polarized beams which are polarized the same as the original incident beams (34) and (35). Beams (58A) and (59A) are transmitted by polarized coating (42) and leave polarizing beamsplitter (40) as beams (60) and (63). Beams (60) and (63) are mutually parallel by virtue of the inherent optical properties of retroflector (45), independent of any tilt that may be present between mirrors (70) and (71). Beam (60) passes through half-wave retardation plate (29B) which rotates the linear polarization of beam (60) by 90° so that resultant beam (62) has a linear polarization which is orthogonal to beam (63). Beam (62) passes through surface (18) to become beam (64) which has the same polarization as beam (62). Surface (18) has an antireflection coating (27B) over the region where beam (62) passes through it. Beam (64) is totally reflected from reflective coating (25B) to become beam (65). Surface (18) has reflective coating (25B) over the region where beam (64) intersects it. Beams (65) and (63) are recombined to form beam (66) by polarizing coating (23B). Surface (17) has polarizing coating (23B) over the region where beams (65) and (63) intersect. Beam (66) passes through surface (17) t become beam (80). Surface (17) has an antireflection coating (21B) over the region where beam (66) passes through it.

Beam (80), like input beam (12), has two frequency components which are orthogonally polarized. Each frequency component has traversed exactly the same optical path length (through air and glass) except for the optical path, nl, between mirrors (70) and (71) where n is the index of refraction of the medium between mirrors (70) and (71) and l is the distance between mirrors (70) and (71). The optical path length corresponding to this distance, l, results in a phase difference between the two frequency components of beam (80). Motion of mirror (70) causes this phase difference to vary. This phase variation is directly proportional to the distance, l, moved by mirror (70) for a constant n and is measured by passing beam (80) through polarizer (81), oriented at 45° to each polarization component, which mixes the two orthogonally polarized frequency components in beam (80) to give beam (82). Similarly, if l is fixed and n varies, then the phase variation is directly proportional to the change in n. The interference between the two frequency components is detected by photodetector (83) as a sinusoidal intensity variation with a frequency equal to the difference frequency between the two components of beam (12). The variation of phase between sinusoidal electrical output (85) and sinusoidal electrical reference signal (11) is measured by the phase meter/accumulator (90), see for example the aforementioned commonly owned copending U.S. patent application Ser. No. 710,928, to provide the output (92) which is directly proportional to the change in optical path length between mirrors (70) and (71). This optical configuration is extremely insensitive to measurement error because the changes in the other optial components, such as those induced mechanically or thermally, affect both frequency components equally and therefore have no influence on the measured phase variation (92). In addition, environmental effects, such as variations in the refractive index of air, can be minimized by placing mirror (71) close to mirror (70) to reduce the optical path length difference between the two frequency components. It should be noted that half-wave retardation plates (29A) and (29B) could be a single element with a hole in it to allow beam (63) to pass through it unaffected.

Figure 2:
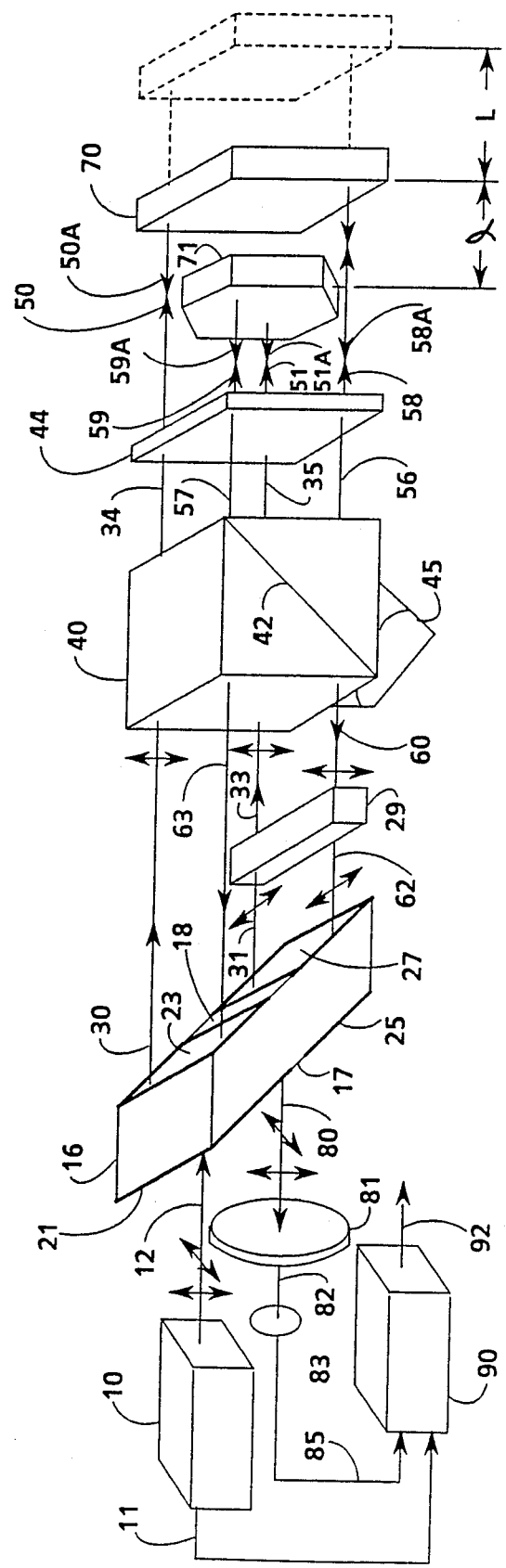
FIG. 2 depicts in schematic form a second embodiment of the instant invention where the optical beams are not in a single plane.

FIG. 2 depicts in schematic form a second embodiment of the instant invention where the optical beams are not in a single plane. This configuration permits a more compact optical system. The description of this figure is identical to FIG. 1 and is numbered correspondingly. The only differences are that now coatings (21A) and (21B), (23A) and (23B), (25A) and (25B), and (27A) and (27B) in FIG. 1 become coatings (21), (23), (25), and (27) respectively; and half-wave retardation plates (29A) and (29B) in FIG. 1 become single half-wave retardation plate (29).

Thus, in FIG. 2, light source (10) which as previously mentioned, most preferably uses a laser, emits input beam (12) which is comprised of two stabilized frequency components which are orthogonally polarized as indicated by the two arrows. Source (10) also provides an electrical reference signal (11) which again corresponds to the frequency difference between the two stabilized frequencies. Beam (12) is incident on shear plate (16) which is a tilted parallel plate glass substrate with optically flat surfaces (17) and (18) which are mutually parallel. The function of tilted parallel plate (16) is to spatially separate the two frequency components using conventional polarization techniques. This, in the embodiment of FIG. 2, beam (12) is divided by shear plate (16) with aid of antireflection coatings (21) and (27), polarizing coating (23) and reflective coating (25), to become vertically polarized beam (30) and horizontally polarized beam (31). Beam (31) passes through the single half-wave retardation plate (29) which rotates the linear polarization of beam (31) by 90° so that resultant beam (33) has the same polarization (but still a different frequency) as beam (30). Beams (30) and (33) enter polarizing beamsplitter (40) with polarizing coating (42) and are transmitted as beams (34) and (35) respectively. Beams (34) and (35) pass through quarter-wave retardation plate (44) and are converted into circularly polarized beams (50) and (51), respectively. Beam (51) is reflected from fixed reference mirror (71) to become beam (51A) while beam (50) is reflected from movable mirror (70) affixed to the stage whose relative position is being measured to become (50A). Beams (50A) and (51A) pass back through quarter-wave retardation plate (44) and are converted back into linearly polarized beams that are orthogonally polarized to the original incident beams (34) and (35). Beams (50A) and (51A) are reflected by polarizing coating (42) to become beams (52) and (53). Beams (52) and (53) are reflected by retroreflector (45) to become beams (54) and (55). Beams (54) and (55) are reflected by polarizing coating (42) to become beams (56) and (57). Beams (56) and (57) pass through quarter-wave retardation plate (44) and are converted into circularly polarized beams (58) and (59). Beam (59) is reflected from fixed reference mirror (71) to become beam (59A) while beam (58) is reflected from movable mirror (70) to become beam (58A). Beams (58A) and (59A) pass back through quarter-wave retardation plate (44) and are converted back into linearly polarized beams that are polarized the same as the original incident beams (34) and (35). Beams (58A) and (59A) are transmitted by polarized coating (42) and leave polarizing beamsplitter (40) as beams (60) and (63). Beams (60) and (63) are mutually parallel by virtue of the inherent optical properties of retroreflector (45), independent of any tilt that may be present between mirrors (70) and (71). Beam (60) passes through the single half-wave retardation plate (29) which rotates the linear polarization of beam (60) by 90° so that resultant beam (62) has a linear polarization which is orthogonal to beam (63). Beams (62) and (63) are combined by shear plate (16), with the aid of antireflection coatings (21) and (27), polarizing coating (23) and reflective coating (25), to become beam (80).

Once again beam (80) in the embodiment of FIG. 2, like input beam (12), has two frequency components which are orthogonally polarized. Each frequency component, as was true with the FIG. 1 embodiment, has traversed exactly the same optical path length (through air and glass) except for the optical path, nl, between mirrors (70) and (71) where n is the index of refraction of the medium between mirrors (70) and (71) and l is the distance between mirrors (70) and (71). The optical path length corresponding to this distance, l, results in a phase difference between the two frequency components of beam (80). Motion of mirror (70) causes this phase difference to vary. This phase variation is directly proportional to the distance, L, moved by mirror (70) for a constant n and is measured by passing beam (80) through polarizer (81), oriented at 45° to each polarization component, which mixes the two orthogonally polarized frequency components in beam (80) to give beam (82). Similarly, if l is fixed and n varies, then the phase variation is directly proportional to the change in n. As was also true on the FIG. 1 embodiment, the interference between the two frequency components is detected by photodetector (83) as a sinusoidal intensity variation with a frequency equal to the difference frequency between the two components of beam (12). The variation of phase between sinusoidal electrical output (85) and sinusoidal electrical reference signal (11) is measured by the phase meter/accumulator (90), to provide the output (92) which as previously mentioned with respect to the FIG. 1 embodiment, is directly proportional to the change in optical path length, nl, between mirrors (70) and (71). Thus, both the FIG. 1 and 2 embodiments employ optical configurations which are extremely insensitive to measurement error because changes in the other optical components, such as those induced mechanically or thermally, affect both frequency components equally and therefore have no influence on the measured phase variation (92). In addition, as was previously mentioned with reference to the FIG. 1 embodiment, environment effects, such as variations in the refractive index of air, can be minimized by placing mirror (71) close to mirror (70) to reduce the optical path length difference between the two frequency components.

The principal advantages of the instant invention are: (1) smaller number of optical components, (2) simpler beam paths, (3) fewer reflections, (4) greater light throughput efficiency, (5) lower waveform distortion, (6) reduced optical leakage, (7) reduced non-linearity errors, and (8) lower cost.

While a preferred embodiment of the invention has been disclosed, obviously modification can be made therein, without departing from the scope of the invention as defined in the following claims.

What is claimed is:

1. A differential plane mirror interferometric system comprising: a pair of plane mirrors separable by a variable optical path length; source means for emitting an input beam comprising two stabilized orthogonally polarized optical frequencies having a frequency difference, said source means further comprising means for providing an electrical reference signal corresponding to said frequency difference between said two stabilized optical frequencies; tilted parallel plate means optically coupled to said input beam for converting said input beam into two separated parallel orthogonally polarized beams; means optically disposed in the path of one of said two separated parallel orthogonally polarized beams for converting said two separated parallel orthogonally polarized beams into two separated parallel beams having the same polarization; means optically coupled to said two separated parallel same polarized beams for causing one of said two separated parallel same polarized beams to be reflected twice by one of said pair of plane mirrors and the other of said two separated parallel same polarized beams to be reflected by the other of said pair of plane mirrors to produce two parallel output beams having the same polarization; means optically disposed in the path of one of said two separated same polarized parallel output beams for converting said two separated same polarized parallel output beams into two separated orthogonally polarized parallel output beams; means optically coupled to said two separated parallel orthogonally polarized output beams for converting said two separated parallel orthogonally polarized output beams into a single output beam having a pair of orthogonally polarized frequency components, with a phase difference therebetween being directly proportional to said variable optical path length between said pair of plane mirrors; means optically coupled to said single output beam for mixing said orthogonally polarized components thereof and producing an electrical measurement signal therefrom; and means operatively connected to said electrical measurement signal and said electrical reference signal for indicating a difference in phase between said electrical reference signal and said electrical measurement signal, said indicated phase difference being proportional to said variable optical path length between said pair of plane mirrors; whereby an optical configuration extremely insensitive to measurement error and misalignment is provided for said interferometric system, said tilted parallel plate means comprising a first set of regions of reflection, antireflection and polarization coatings, said means for converting said two separated parallel orthogonally polarized output beams into said single output beams comprising said first set of regions and coatings on said tilted parallel plate means, said tilted parallel plate means further comprising a second set of regions of reflection, antireflection and polarization coatings, said second set of regions and coatings comprising said input beam converting means.

2. A differential plane mirror interferometric system in accordance with claim 1 wherein said means for providing an electrical reference signal comprises a frequency stabilized electronic oscillator.

3. A differential plane mirror interferometric system in accordance with claim 1 wherein said means for providing an electrical reference signal comprises a photoelectric mixer and an electronic amplifier means.

4. A differential plane mirror interferometric system in accordance with claim 1 wherein said means for converting said two separated parallel orthogonally polarized beams into said two same polarized separated parallel beams comprises a half-wave retardation plate means.

5. A differential plane mirror interferometric system in accordance with claim 1 wherein said means for causing each of said separated parallel same polarized beams to be reflected twice by one of said pairs of plane mirrors comprises a polarizing beam splitter means and a retroreflector means.

6. A differential plane mirror interferometric system in accordance with claim 5 wherein said means for causing each of said separated parallel same polarized beams to be reflected twice by one of said pairs of plane mirrors further comprises a quarter wave retardation plate means.

7. A differential plane mirror interferometric system in accordance with claim 1 wherein said means for converting said two separated parallel same polarized output beams into two separated parallel orthogonally polarized output beams comprises a half-wave retardation plate means.

8. A differential plane mirror interferometric system in accordance with claim 1 wherein said means for producing said electrical measurement signal comprises a polarizer means for mixing said single output beam orthogonal components.

9. A differential plane mirror interferometric system in accordance with claim 8 wherein said means for producing said electrical measurement signal further comprises a photoelectric detector.

10. A differential plane mirror interferometric system in accordance with claim 1 wherein said means for producing said electrical measurement signal comprises a photoelectric detector.

11. A differential plane mirror interferometric system in accordance with claim 1 wherein said phase difference indicating means composes a phase meter/accumulator means.

12. A differential plane mirror interferometric system in accordance with claim 6 wherein said means for converting said two separated parallel same polarized output beams into said two separated parallel orthogonally polarized output beams comprises a second half-wave retardation plate means.

13. A differential plane mirror interferometric system in accordance with claim 12 wherein said means for producing said electrical measurement signal comprises a polarizer means for mixing said single output beam orthogonal components.

14. A differential plane mirror interferometric system in accordance with claim 13 wherein said means for producing said electrical measurement signal further comprises a photoelectrical detector.

15. A differential plane mirror interferometric system in accordance with claim 14 wherein said phase difference indicating means comprises a phase meter/accumulator means.

16. A differential plane mirror interferometric system in accordance with claim 1 wherein said tilted parallel plate means comprises both said first and second set of regions and coatings.

17. A differential plane mirror interferometric system in accordance with claim 1 wherein said source means comprises a laser.

18. A differential plane mirror interferometric system in accordance with claim 14 wherein said source means comprises a laser.

19. A differential plane mirror interferometric system in accordance with claim 16 wherein said tilted parallel plate means comprises a tilted glass substrate having mutually parallel optically flat surfaces, with said sets of regions and coatings being disposed on said optically flat surfaces.

20. A differential plane mirror interferometric system in accordance with claim 1 wherein said tilted parallel plate means comprises a tilted glass substrate having mutually parallel optically flat surfaces, with said sets of regions and coatings being disposed on said optically flat surfaces.

21. A differential plane mirror interferometric system in accordance with claim 1 wherein said tilted parallel plate means comprises a tilted plate substrate having mutually parallel optically flat surfaces.

22. A differential plane mirror interferometric system in accordance with claim 15 wherein said tilted parallel plate means comprises a tilted glass substrate having mutually parallel optically flat surfaces, with said sets of regions and coatings being disposed on said optically flat surfaces.

23. A differential plane mirror interferometric system in accordance with claim 22 wherein said tilted parallel plate means comprises a common tilted parallel plate comprising both said first and second set of regions and coatings.

24. A differential plane mirror intereferometric system in accordance with claim 23 wherein said source means comprises a laser.

25. A differential plane mirror interferometric system in accordance with claim 1 wherein one of said pair of plane mirrors is fixed and comprises a reference mirror and the other of said pair of plane mirrors is movable for providing said variable distance between said pair of separable plane mirrors.

26. A differential plane mirror interferometric system in accordance with claim 14 wherein one of said pair of plane mirrors is fixed and comprises a reference mirror and the other of said pair of plane mirrors is movable for providing said variable distance between said pair of separable plane mirrors.

27. A differential plane mirror interferometric system in accordance with claim 26 wherein said source means comprises a laser.

28. A differential plane mirror interferometric system in accordance with claim 1 wherein all of said beams are in a single plane.

29. A differential plane mirror interferometric system in accordance with claim 28 wherein said source means comprises a laser.

30. A differential plane mirror interferometric system in accordance with claim 15 wherein all of said beams are optical beams and all of said optical beams are in a single plane.

31. A differential plane mirror interferometric system in accordance with claim 30 wherein said source means comprises a laser.

32. A differential plane mirror interferometric system in accordance with claim 1 wherein all of said beams are optical beams, said optical beams being in a given plane.

33. A differential plane mirror interferometric system in accordance with claim 32 wherein said source means comprises a laser.

34. A differential plane mirror interferometric system in accordance with claim 15 wherein all of said beams are optical beams, said optical beams being in plurality of planes, with a given optical beam being in a given plane.

35. A differential plane mirror interferometric system in accordance with claim 34 wherein said source means comprises a laser.

36. A differential plane mirror interferometer system in accordance with claim 1 wherein the distance between said pair of plane mirrors is fixed for providing the variations in the index of refraction of the medium between said pair of plane mirrors.

37. A differential plane mirror interferometric system in accordance with claim 14 wherein the distance between said pair of plane mirrors is fixed for providing the variation in the index of refraction.

* * * * *

UNITED STATES PATENT AND TRADEMARK OFFICE
CERTIFICATE OF CORRECTION

PATENT NO. : 4,752,133

DATED : June 21, 1988

INVENTOR(S) : GARY E. SOMMARGREN

It is certified that error appears in the above-identified patent and that said Letters Patent is hereby corrected as shown below:

Column 1, line 28: Before "This", insert a period (.).

Column 1, line 66: After "reflection", insert a comma (,).

Column 1, line 67: Change "polarizing" to --polarization--.

Column 2, line 17: After "reflection", insert a comma (,).

Column 2, line 18: Change "polarizing" to --polarization--.

Column 2, line 57: Change "patent application Ser." to --Patent Application Serial--.

Column 2, line 67: Change "refernce" to --reference--.

Column 3, line 9: Change "(1)" to --(17)--.

Column 4, line 6: Change "t become" to --to become--.

Column 4, line 13: Change "nl" to --n$\ell$--.

Column 4, line 15: Change "l" to --$\ell$--.

Column 4, line 17: Change "l" to --$\ell$--.

Column 4, line 21: Change "l" to --$\ell$--.

Column 4, line 25: Change "l" to --$\ell$--.

UNITED STATES PATENT AND TRADEMARK OFFICE
CERTIFICATE OF CORRECTION

PATENT NO. : 4,752,133
DATED : June 21, 1988
INVENTOR(S) : GARY E. SOMMARGREN

It is certified that error appears in the above-identified patent and that said Letters Patent is hereby corrected as shown below:

Column 4, line 40: Before "changes", delete --the--. Change "optial" to --optical--.

Column 5, line 9: After "(16)", insert a comma (,).

Column 5, line 58: After "(80)", insert a comma (,).

Column 5, line 63: Change "nl" to --n$\ell$--.

Column 5, line 66: Change "l" to --$\ell$--.

Column 5, line 67: Change "l" to --$\ell$--.

Column 6, line 8: Change "l" to --$\ell$--.

Column 6, line 21: Change "nl" to --n$\ell$--.

Column 7, line 58: Change "quarter wave" to --quarter-wave--.

Column 8, line 29: Change "photoelectrical" to --photoelectric--.

UNITED STATES PATENT AND TRADEMARK OFFICE
CERTIFICATE OF CORRECTION

PATENT NO. : 4,752,133

DATED : June 21, 1988

INVENTOR(S) : GARY E. SOMMARGREN

It is certified that error appears in the above-identified patent and that said Letters Patent is hereby corrected as shown below:

Column 8, line 58: Change "tilted plate substrate" to --tilted glass substrate--.

Signed and Sealed this

Nineteenth Day of May, 1992

Attest:

DOUGLAS B. COMER

*Attesting Officer*     *Acting Commissioner of Patents and Trademarks*